United States Patent [19]
Davis

[11] 3,773,348
[45] Nov. 20, 1973

[54] VEHICLE SUSPENSION ASSEMBLY
[75] Inventor: Leo W. Davis, Dallas, Tex.
[73] Assignee: Peerless Mfg. Co., Dallas, Tex.
[22] Filed: May 8, 1972
[21] Appl. No.: 250,946

[52] U.S. Cl. ......... 280/124 A, 280/112 R, 267/65 R
[51] Int. Cl. ............................................. B60p 3/00
[58] Field of Search .......... 280/124 R, 124 A, 124 F, 280/112 R, 112 A, 111, 81 A; 267/65 R

[56] References Cited
UNITED STATES PATENTS

| | | | |
|---|---|---|---|
| 3,254,899 | 6/1966 | Voorhies | 280/124 A |
| 3,702,196 | 11/1972 | Krutis | 280/111 |
| 2,576,824 | 11/1951 | Bush | 280/124 R |
| 3,133,745 | 5/1964 | Granning | 280/124 F |

*Primary Examiner*—Philip Goodman
*Assistant Examiner*—John A. Carroll
*Attorney*—D. Carl Richards et al.

[57] ABSTRACT

Large vehicles such as off-highway dump trucks provide extraordinary suspension problems due to the immense weight of the vehicles. A suspension assembly particularly useful for such vehicles includes a dual wheel set supported by an axle housing therebetween. Trunnions extend forwardly and rearwardly from the ends of the housing. The forwardly extending trunnion is received within a spherical, laminated, elastomeric, bearing element which is affixed to the vehicle frame. The rearwardly extending trunnion is similarly received within a spherical, laminated, elastomeric, bearing element which is affixed to the piston member of a rigidly mounted, shock absorbing suspension strut. The bearing members permit axial, radial and vertical movement of the trunnions relative to the frame of the vehicle. An arm extends vertically from the housing and is received within a recess in the frame to restrict radial movement of the suspension assembly beyond desired limits by engagement of the arm against spaced, parallel walls which partially define the recess. Axial, lateral and vertical forces are transmitted to the frame through the forwardly positioned bearing member and the shock absorbing suspension strut.

16 Claims, 6 Drawing Figures

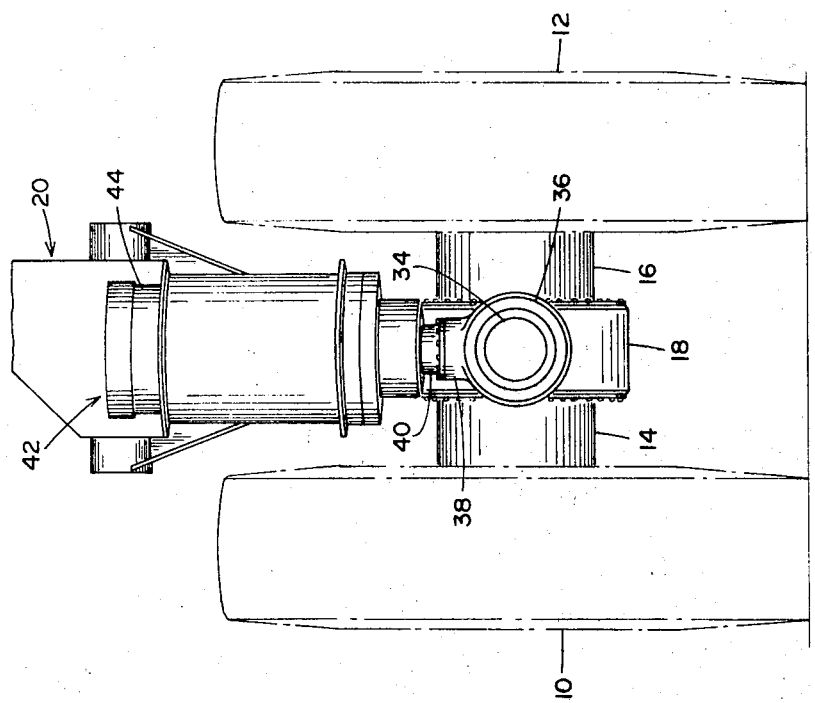
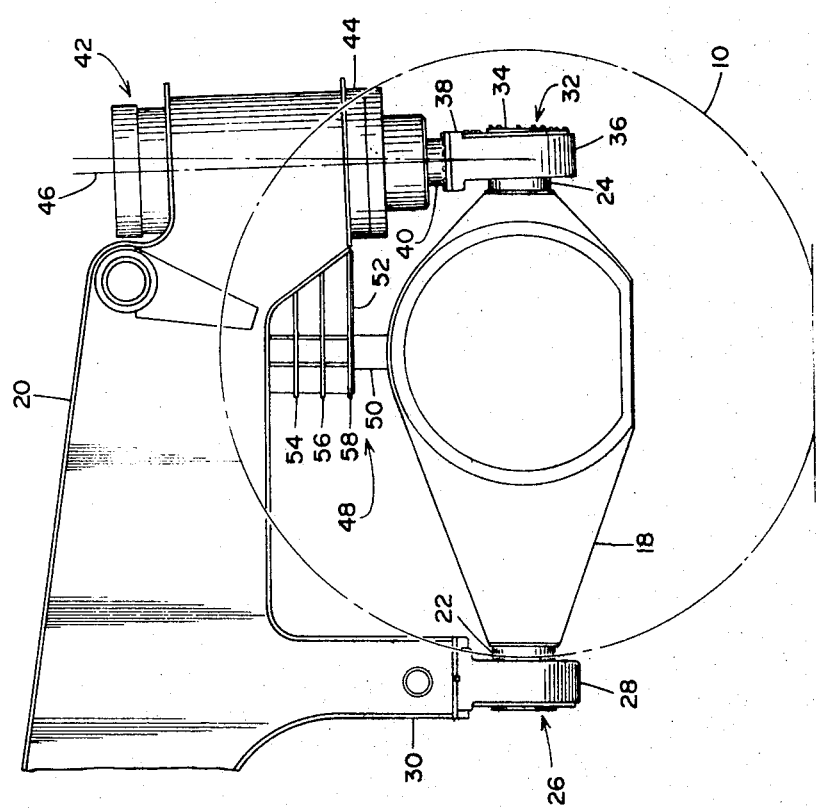

PATENTED NOV 20 1973 3,773,348

VEHICLE SUSPENSION ASSEMBLY

This invention relates to vehicle suspension assemblies for trucks, buses and other heavy vehicles and more particularly to a vehicle suspension assembly having rigidly mounted components.

Technological progress and economic precepts of the day have resulted in a demand for high volume production in the mining industry. High volume production requires substantial capital investments in mine hauling equipment. In many instances, the ultimate determinants in the economic life of an open pit mine are the haulage and material handling operations. To bring material handling costs in line with other costs of a mining operation improved and more reliable vehicles with larger load carrying capabilities become a requirement. As mine vehicles increase in size, the problems of reliability increase due primarily to increased stresses placed on the vehicle components including the suspension assembly.

In fact, the suspension assemblies of large mining vehicles have presented some particularly perplexing problems of reliability. The ordinary articulated suspension assembly becomes unreliable due primarily to the concentration of forces from the supporting wheels to the vehicle frame through a pivoted connection. The weak link, so to speak becomes the pivoted connection which must be designed to withstand all the forces exerted on the wheel "bogey" assembly from the vehicle frame. With such systems it is also necessary to provide a lateral reaction member such as a pan hard rod or a sliding guide.

A feature of the present invention is to provide distribution of forces between wheel supporting apparatus and a vehicle frame. Another feature of the invention is to provide a relatively maintenance free, rigid connection between wheel supporting structure and the vehicle frame to improve the reliability of vehicle suspension assemblies. This invention utilizes a suspension strut which serves as a lateral load reaction member and thus does not require a pan hard rod or guide. The pan hard rod type of suspension assembly has the disadvantage of requiring lateral displacement of the wheels as it swings on its bearings during movement of the vehicle.

The present invention can be generally described as a suspension assembly for a vehicle having a frame and a ground engaging movable member which permit advancement of the vehicle relative to the ground. The assembly includes a housing which supports the ground engaging member and has first and second trunnions extending therefrom; one of said trunnions extends forwardly and the other of said trunnions extends rearwardly from said housing.

A first bearing is mounted on said first trunnion and is attached to the vehicle frame. A shock absorbing suspension strut having a first member rigidly attached to said vehicle frame and a second member movable with respect to said first member is also provided. A second bearing mounted on the second trunnion is attached to the second number of the suspension strut. One of the bearings permits at least radial and vertical movement of the trunnion to which it is mounted relative to the frame and the other of said bearings permits radial, vertical and axial movement of the trunnion to which it is mounted relative to the frame.

A more complete understanding of the invention and its advantages will be apparent from the specification and claims and from the accompanying drawings illustrative of the invention.

Referring to the drawings:

FIG. 1 is a side view of the rear bogey of a vehicle showing a rigidly mounted suspension strut;

FIG. 2 is a side view of the bogey of FIG. 1 and also illustrating a rigidly mounted suspension strut;

Figure 4:
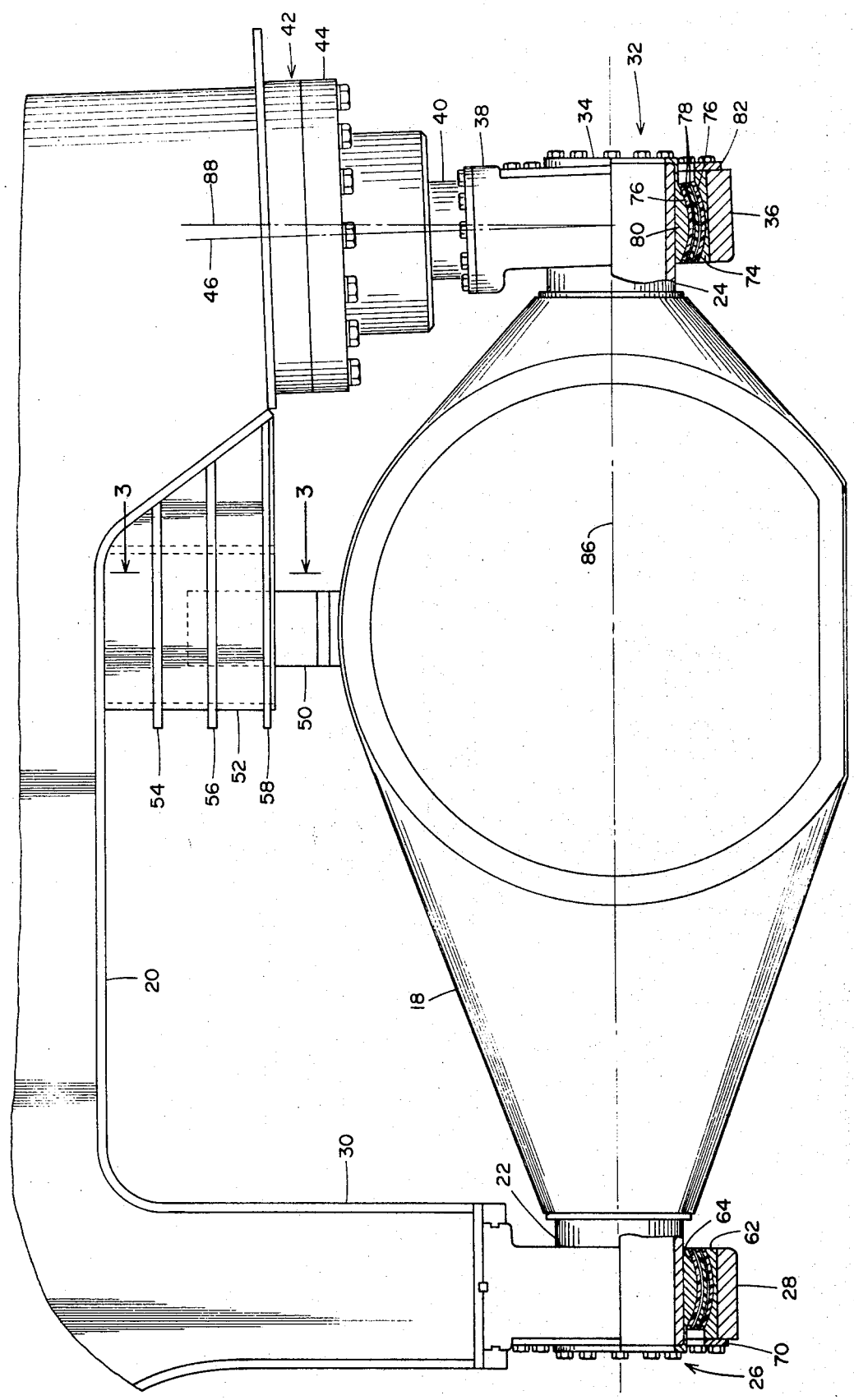
FIG. 4 is a side view, partially in section, of the vehicle suspension assembly in accordance with the present invention.

Referring to FIGS. 1 and 2, there is shown a suspension assembly for a dual wheel set for supporting a vehicle, such as an ore carrier of the type found in open pit mining operations.

In a typical ore hauling vehicle, four dual wheel sets are used to support the vehicle. Each of the wheels (tires) 10 and 12, which are usually of a rubber composition on a steel body, are individually powered by electric motors. The electric motor for powering the wheel 10 is located in a shroud 14 and the electric motor for powering the wheel 12 is located in a shroud 16. These shrouds 14 and 16 are fastened by means of bolted flanges to an axle carrying housing 18. Power for energizing the motor drive for each of the wheels 10 and 12 is typically provided by a diesel-electric generator carried by the vehicle supporting frame 20. Such control systems are conventional and a further description is not deemed necessary.

To support the frame 20 through the wheels 10 and 12, the axle carrying housing 18 includes cylindrical trunnions 22 and 24 extending from the ends thereof. The forward trunnion 22 is received within a laminated rubber and metal bearing 26 fastened into the bearing mount 28 that is rigidly bolted to the forward leg 30 of supporting frame 20. The rear trunnion 24 extends through a rubber and metal bearing 32 which is bolted by means of a flange 34 to a bearing mount 36. The bearing mount 36 includes a flange 38 rigidly attached to a piston 40 of a shock absorbing, suspension strut 42 having a cylinder 44 reciprocally mounted with respect to the piston to cooperate therewith to form a shock absorbing, suspension member. Typically, the cylinder 44 contains a dampening fluid. Suspension strut 42 may take various conventional forms. However, the type of suspension strut illustrated in U. S. Pat. No. 3,256,005 is preferred.

An important feature of the present invention is the rigid mounting of the cylinder 44 to the supporting frame 20 thereby restricting the stroke of the piston 40 to always be along a fixed line, generally indicated by the center line 46. To be more specific, as the wheels 10 and 12 mounted to the axle carrying housing 18 encounter asperities in the terrain the rear trunnion 24 will move up and down. This up and down movement will not be longitudinal but will cause the trunnion to move along an arc. Restraint of the front trunnion 22 causes the end of the trunnion 24 to move through a circular arcuate path with bearing 26 as the center of radius. Since a resilient bearing 32 is utilized between the rear trunnion 24 and the bearing mount 36, radial, axial and vertical movement of the rear trunnion relative to the bearing mount 36 is permitted due to the elastomeric nature of the rubber portion of the bearing 32. Thus, the cylinder 44 of the suspension strut 42 may be rigidly rather than pivotally mounted to the supporting frame 20 since any deviations of the rear trunnion 24 from a path along the line 46 will be accommodated by the rear bearing 32 and the front bearing 26 which also flexes axially.

Figure 3:
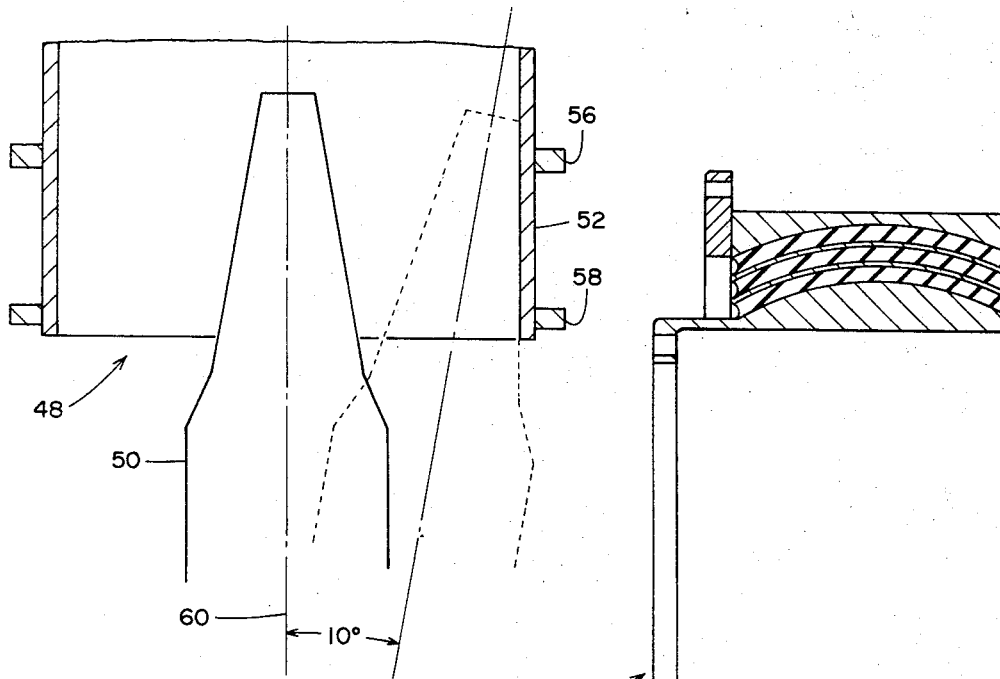
FIG. 3 is a cross-section of a radial restraining mechanism to limit the radial movement of the housing in the suspension assembly of FIG. 2.

As the wheels 10 and 12 traverse ridges and ruts in a road, trunnions 22 and 24 will rotate within their respective bearings 26 and 32. To limit the amount of rotational or radial movement between the trunnions and the respective bearing, a restraining assembly 48 is provided. This assembly includes a protruding arm 50, as best illustrated in FIG. 3, welded or otherwise attached to the axle carrying housing 18. This arm 50 extends into a recess 51 in housing 52 welded or otherwise rigidly attached to the supporting frame 20. Encircling the housing 52 are bolsters 54, 56 and 58.

As best illustrated in FIG. 3 by the dotted outline of the arm 50, the restraining assembly 48 limits the rotation of the axle carrying housing 18 to ± 10° of a center line position, indicated by a center line 60. Movement beyond this degree is prevented by engagement of arm 50 with the opposite parallel walls 53 and 55 of housing 52.

Figure 5:
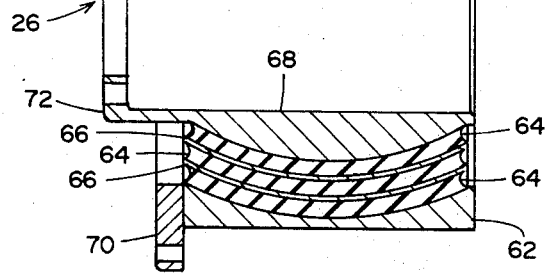
FIG. 5 is a sectional view of a tubular-type spherical bearing of elastomeric elements.

Referring to FIG. 4, there is shown an enlarged view of the suspension assembly including a partial section of the trunnions 22 and 24 and their respective bearings 26 and 32. With reference to the bearing 26, as shown enlarged in FIG. 5, it includes an outer race 62 having a cylindrical outer surface and a concave spherical inner surface. In intimate contact with the spherical surface of the outer race 62 is one of three elastomeric elements 64 interleaved with steel spacers 66. Together, the elastomeric elements 64 and the steel spacers 66 form a laminated tubular-type spherical configuration. The innermost of the elastomeric elements 64 is adhered to an inner race 68 having a convex spherical outer surface and a cylindrical inner surface mating with the outer diameter of the rear trunnion 22. The entire bearing structure is bolted to the bearing mount 28 by means of a flange 70. To secure the bearing 26 to the trunnion 22, the inner race 68 includes an end plate 72 bolted to the trunnion.

The bearing 32 is similar in design to the bearing 26 and includes an outer race 74 having an outer diameter mating with the inner diameter of the bearing mount 36. Adhered to the inner surface of the race 74 is a laminated structure of three elastomeric elements 76 interleaved with steel spacers 78. An inner race 80 has an outer surface mating with the innermost elastomeric element 76 and has an inner surface mating with the outer diameter of the trunnion 24. The bearing 32 is bolted to the bearing mount 36 by means of a flange 82. To secure the bearing 32 to the trunnion 24, the inner race 68 includes an end plate 34 bolted to the trunnion and the inner race.

To provide for the normal working alignment of the longitudinal axis through the trunnions 22 and 24 and the longitudinal axis of the strut 42, the center line 46 through the strut 42 is displaced from the perpendicular with the longitudinal axis through the trunnions 22 and 24 in a static unloaded condition.

Figure 6:
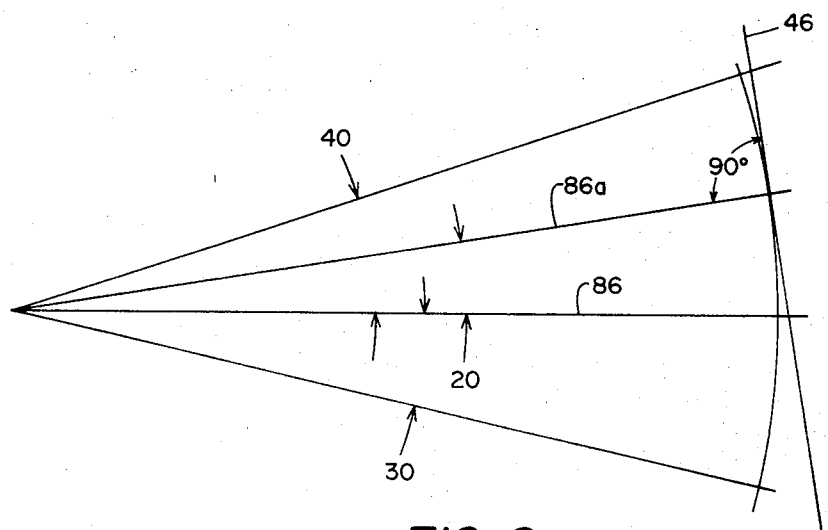
FIG. 6 is an illustration of movement for a vehicle suspension assembly employing a rigidly mounted suspension strut.

This relationship is illustrated in FIG. 6 wherein the center line 86 corresponds with the same numbered center line of FIG. 4. The center line 86 represents the position of the trunnions 22 and 24 with respect to the center line 46 of the suspension strut 42 in a static unloaded condition. In the static unloaded condition, the center line 86 is perpendicular to a center line through the bearing mount 28 and the center line through the bearing 26. Under these conditions, it will be noted that there is an angular displacement between the center line 46 of the suspension strut 42 and a line 88 perpendicular to the center line 86. Typically, the angular displacement between the center line 46 and the perpendicular 88 is 2°.

With a normal static load on the vehicle, the trunnions 22 and 24 move with respect to the associated bearing housings 28 and 36, respectively. This condition is illustrated in FIG. 6 wherein the longitudinal axis through the trunnions 22 and 24 is indentified by the reference numeral 86a. In this position of the trunnions 22 and 24 with respect to the suspension strut 42, a right angle relationship exists between the center line 86a and the center line 46.

Typically, the longitudinal axis through the trunnions 22 and 24 moves vertically slightly in excess of 2° between a static unloaded condition and a static loaded condition. As the vehicle traverses ridges and ruts the entire bogey assembly moves about the bearing 26 of the front trunnion 22. This causes vertical displacement between the piston 40 and the cylinder 44 and rotation of the rear trunnion 25 within the bearing mount 36. Typically, the longitudinal axis through the trunnions 22 and 24 rotates from 3° to 4° from the static unloaded position.

The front and rear bearings 26 and 32, respectively, permit radial, vertical and axial movement of the trunnions 22 and 24 relative to the frame 20. Radial displacement is limited, as explained before, by the restraining assembly 48. Vertical movement of front trunnion 22 is slight, but permits movement of piston member 40 within cylinder 44. As piston 40 moves upwardly the lower portion of the front and upper portion of the rear of bearing 26 will be put in compression while the upper portion of the front and lower portion of the rear of bearing 26 will be put in tension by the vertical movement of trunnion 22. The degree of axial movement of trunnions 22 and 24 relative to frame 20 will depend not only upon the position of piston 40 relative to cylinder 44, as explained above, but also the dynamic motion of the vehicle. For example, if the vehicle is accelerating while the piston 40 is moving upwardly or downwardly past line 86a (FIG. 6) the forces tending to displace trunnion 22 rearwardly will be counteracted. Conversely, if the vehicle is decelerating the axial force tending to move trunnion 22 rearwardly will accentuate the rearward force arising from the upward or downward movement of piston 40 past line 86a. Conversely, the forces acting on rear bearing 32 when piston 40 strokes past line 86a in either direction are accentuated by acceleration and counteracted by deceleration.

While bearing members having an elastomeric element are preferred other types of bearings may be used so long as they permit at least radial and vertical freedom at one of the trunnions and radial, vertical and axial freedom at the other trunnion.

While only one embodiment of the invention, together with modifications thereof, has been described in detail herein and shown in the accompanying drawings, it will be evident that various modifications are possible without departing from the scope of the invention.

What is claimed is:

1. A suspension assembly for a vehicle having a frame and a ground engaging movable member which permit advancement of the vehicle relative to the ground, which assembly comprises:
    a housing which supports the ground engaging member and has first and second trunnions extending therefrom, one of said trunnions extending forwardly and the other of said trunnions extending rearwardly from said housing;
    a first bearing mounted on said first trunnion and attached to the vehicle frame;
    a shock absorbing, suspension strut having a first member rigidly attached to said vehicle frame and a second member movable with respect to said first member; and
    a second bearing mounted on said second trunnion and attached to the second member of the suspension strut, one of said bearings permitting at least radial and vertical movement of the trunnion to which it is mounted relative to the frame and the other of said bearings permitting radial, vertical and axial movement of the trunnion to which it is mounted relative to the frame.

2. The assembly of claim 1, wherein both of said bearing members permit radial, vertical and axial movement of the trunnion to which it is mounted relative to the frame.

3. The assembly of claim 2, wherein the bearing members include a distortable material.

4. The assembly of claim 3, wherein said bearing members include spherical laminated outer elements and a tubular inner race.

5. A suspension assembly for a vehicle having a supporting frame comprising:
    an axle carrying member for supporting wheels on said vehicle and having first and second trunnions extending therefrom in a substantially aligned position;
    a first bearing comprising a distortable material mounted to the first trunnion and attached to the supporting frame;
    a supenstion strut having a first member rigidly attached to the supporting frame and a second member movable with respect to the first member; and
    a second bearing comprising a distortable material mounted to the second trunnion and attached to the second member of said suspension strut.

6. A suspension assembly for a vehicle having a supporting frame as set forth in claim 5, wherein said first and second bearings include laminated elastomeric elements.

7. A suspension assembly for a vehicle having a supporting frame as set forth in claim 6, wherein said elements have a tubular-type spherical configuration.

8. A suspension assembly for a vehicle having a supporting frame as set forth in claim 5, wherein said suspension strut includes a cylindrical member containing a dampening element and a piston member movable with respect to said cylindrical member.

9. A suspension assembly for a vehicle having a supporting frame as set forth in claim 5, wherein said suspension strut includes a cylindrical first member rigidly attached to the supporting frame and filled with a dampening fluid and a piston second member movable with respect to said cylindrical member and attached to the second bearing.

10. A suspension assembly for a vehicle having a supporting frame as set forth in claim 9, wherein said cylindrical first number is rigidly mounted to the supporting frame at an angle with respect to a longitudinal axis extending through the first trunnion of said axle carrying member.

11. A suspension assembly for a vehicle having a supporting frame comprising:
    an axle carrying member for supporting wheels of said vehicle and having first and second trunnions extending therefrom in a substantially aligned position;
    a first tubular-type spherical bearing of laminated elastomeric elements mounted to the first trunnion and attached to the supporting frame;
    a suspension strut having a cylindrical member rigidly attached to the supporting frame and filled with a dampening fluid and a piston second member movable with respect to the cylindrical member; and
    a second tubular-type spherical bearing of laminated elastomeric elements mounted to the second trunnion and attached to the piston member of the suspension strut.

12. A suspension assembly for a vehicle having a supporting frame as set forth in claim 11, wherein said cylindrical first member is rigidly mounted to the supporting frame at an angle with respect to a longitudinal axis extending through the first trunnion.

13. A suspension assembly for a vehicle having a supporting frame comprising:
    an axle carrying member for supporting wheels of said vehicle and having first and second trunnions extending therefrom in a substantially aligned position;
    a first bearing comprising a distortable material mounted to the first trunnion and attached to the supporting frame;
    a suspension strut having a first member rigidly attached to said supporting frame and a second member movable with respect to the first member;
    a second bearing comprising a distortable material mounted to the second trunnion and attached to the second member of said coupler means; and
    restraining means between said axle carrying member and the supporting frame to restrict the radial movement of the former with respect to the latter.

14. A suspension assembly for a vehicle having a supporting frame as set forth in claim 13, wherein said first and second bearings include laminated elastomeric elements of a tubular-type spherical configuration.

15. A suspension assembly for a vehicle having a supporting frame as set forth in claim 14, wherein said suspension strut includes a cylindrical first member rigidly attached to the supporting frame and filled with a dampening fluid and a piston second member movable with respect to the cylindrical member and attached to said second bearing.

16. A suspension assembly for a vehicle having a supporting frame as set forth in claim 15 wherein the cylindrical first member is rigidly mounted to the supporting frame at an angle with respect to a longitudinal axis extending through the first trunnion.

* * * * *